United States Patent [19]

Tirró et al.

[11] Patent Number: 4,722,083
[45] Date of Patent: Jan. 26, 1988

[54] SATELLITE TELECOMMUNICATIONS SYSTEM FEATURING MULTI-BEAM COVERAGE AND DYNAMICALLY CONTROLLED ALLOCATION OF THE SATELLITE TRANSMISSION CAPACITY

[75] Inventors: Sabastiano Tirró; Arduino Patacchini, both of Rome, Italy

[73] Assignee: Consiglio Nazionale Delle Richerche, Italy

[21] Appl. No.: 794,650

[22] Filed: Nov. 4, 1985

[30] Foreign Application Priority Data

Nov. 2, 1984 [IT] Italy ............................... 23438 A/84

[51] Int. Cl.⁴ .............................................. H04J 3/16
[52] U.S. Cl. ...................................... 370/95; 370/104
[58] Field of Search ................. 370/80, 93, 94, 95, 370/104; 455/12

[56] References Cited

U.S. PATENT DOCUMENTS

| | | | |
|---|---|---|---|
| 3,634,627 | 1/1972 | Velentini | 370/95 |
| 3,731,281 | 5/1973 | Gordon et al. | 370/95 |
| 4,322,845 | 3/1982 | Fennel, Jr. et al. | 370/95 |
| 4,480,328 | 10/1984 | Alaria | 370/95 |
| 4,491,947 | 1/1985 | Frank | 370/94 |
| 4,504,946 | 3/1985 | Raychaudhuri | 370/104 |

Primary Examiner—Robert L. Griffin
Assistant Examiner—Stephen Chin
Attorney, Agent, or Firm—Darby & Darby

[57] ABSTRACT

The invention relates to a satellite telecommunications system featuring multi-beam coverage and dynamically controlled allocation of the satellite transmission capacity, of the type where a number of earth stations are linked to a satellite on board which regeneration of the earth-to-satellite signal is brought about. The system also features a modular beam-switching pattern and utilizes asynchronous protocol procedures for the exchanges between earth traffic stations and master station relative to telephone conversations and videoconferences, and for remote control of an on-board switching matrix (2) which operates the system, that is, allocates the satellite's transmission capacity so as to serve all the earth stations.

8 Claims, 1 Drawing Figure

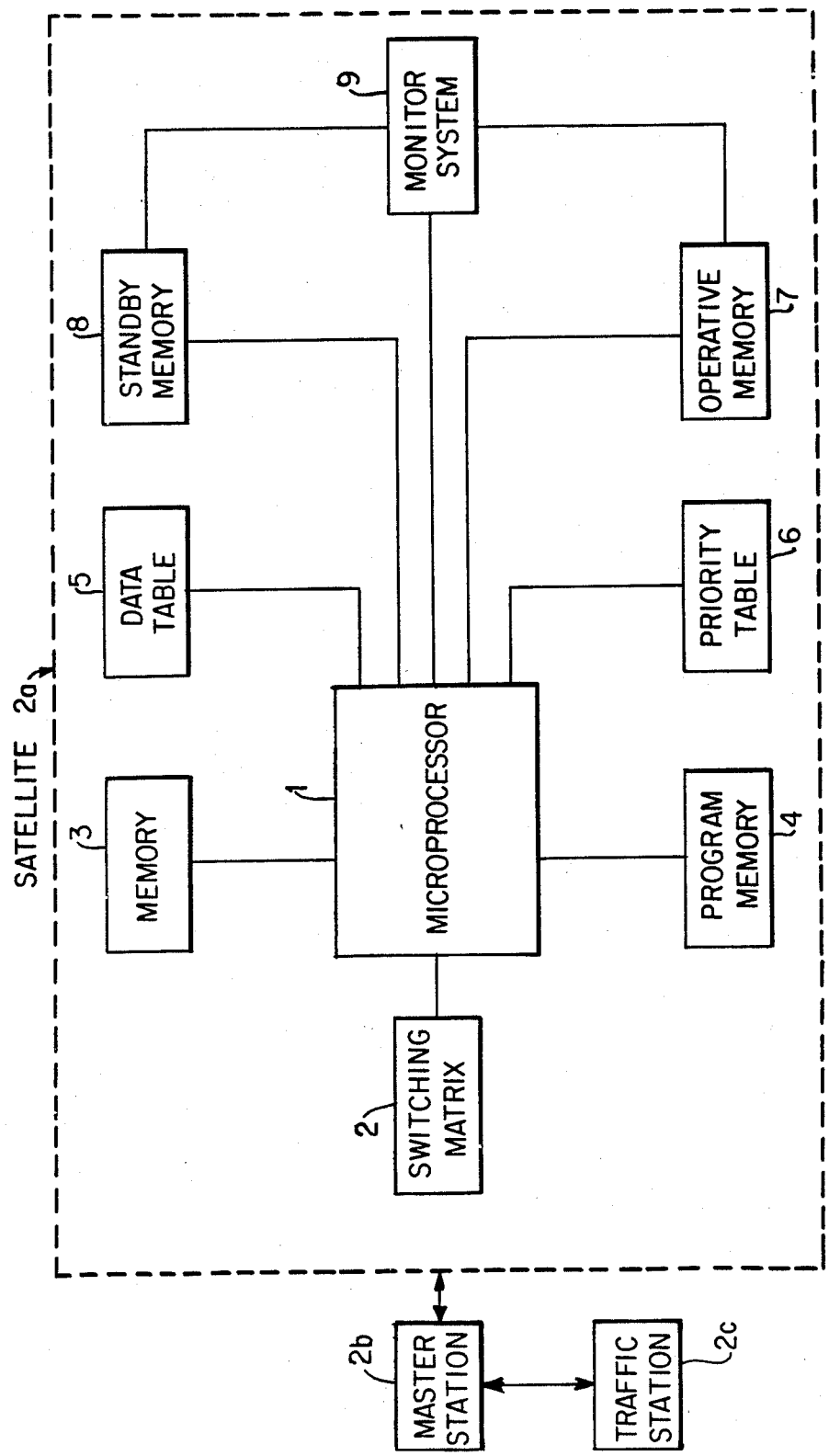

SATELLITE TELECOMMUNICATIONS SYSTEM FEATURING MULTI-BEAM COVERAGE AND DYNAMICALLY CONTROLLED ALLOCATION OF THE SATELLITE TRANSMISSION CAPACITY

BACKGROUND OF THE INVENTION

The invention disclosed relates to a satellite telecommunications system featuring multi-beam coverage and dynamically controlled allocation of the satellite transmission capacity.

An important facet of satellite communications is the method of link-up between the satellite and the various earth stations. A person skilled in the art will know that many satellite telecommunications systems developed thus far have been of a multiple access time-division type (TDMA and SS-TDMA) utilizing non-modular switching patterns. In such systems, earth stations can transmit special packages of data, known as bursts, relative to different kinds of media or different services. Only multi-destination bursts exist however, which are of varying length, and generally contain almost the total traffic handled by the emitting station and directed toward a given repeater.

Briefly, with a non-modular switched pattern, each variation in capacity of a given earth station can affect the allocation of bursts emitted from other stations. As there is no beam-pattern password generated on board the satellite in such systems, recourse must be made to complex techniques for its diffusion, as well as to a number of tracking stations needed for continuous monitoring of an onboard clock which governs the beam switching matrix, and to stand-by protocol arrangements that must be implemented in the event of a malfunction occurring at one of the two stations linked.

All communications satellites utilized hither to are therefore "transparent": that is, the signal received is amplified once and has its frequency changed, by a transponder, and is re-transmitted to earth; such satellites cannot therefore be regarded as genuine repeaters located in space.

The system incorporates digital speech interpolation (DSI) which, when transmitting, permits doubling the gain of the transmission capacity. A DSI station transmits a multi-destination burst containing all the traffic between that station and corresponding stations of the same group. When receiving, the DSI station must be able to analyse a given quantity of bursts originating from different sources; the input capacity of a DSI station may be, for instance, 240 voice channels. The concept has since been introduced of allocation on demand within systems operating on DSI, that is, the facility of varying the number of satellite channels allocated to each DSI station.

The introduction of such allocation-on-demand techniques necessarily dictates the use of special protocols, special procedures which must be adopted in allocation of available satellite transmission capacity to the various earth stations. In modern 4-6 GHz and 11-14 GHz systems, the lower frequencies utilized are such as to permit adopting protocols with a lower degree of protection than is necessary at 20-30 GHz, in view of the fact that the attenuating effect of the atmosphere is much reduced. These protocols are different from the procedures used in simple rearrangement of traffic; they can provide frequent re-allocation of transmission capacity to serve the various earth stations, as well as bring about such re-allocation in real time, whereas the latter type are unable to perform either function by reason of their periodic type of operation.

With a non-modular beam-switching pattern it becomes necessary, generally speaking, to make a rearrangement of the entire system for integration even of the smallest variation.

Protocols adopted for the systems mentioned thus far are exclusively of the synchronous type, inasmuch as a variation in the beam-pattern of TDMA systems will affect satellite and earth stations alike; one is therefore faced with limitations, as the system is rendered particularly inflexible. It will be observed moreover, that the method of access generally adopted in modern satellite systems (TDMA) is conditioned by the type of coverage selected. More exactly, one must ensure full interconnection between all antenna beams of a multi-beam coverage system, especially where the number of such beams is particularly great. This requirement has produced the passage from standard TDMA to SS-TDMA: satellite switched time-division, multiple access.

A global coverage system, on the other hand, makes for difficult coordination with other systems and is characterized by low gain of the on-board antenna.

There are also scanning-type systems, but these are extremely complex as a result of high transmission speeds, which call for equally complex apparatus.

It is the object of the invention disclosed herein to eliminate the drawbacks thus outlined which beset systems currently in use, by design and embodiment of a satellite telecommunications system featuring multi-beam coverage and dynamically controlled allocation of the satellite transmission capacity, so as to enable optimum handling of signals transmitted from the various earth stations, wherein regeneration of such signals is brought about on board the satellite and wherein the system utilizes a modular beam switching pattern and asynchronous type protocol procedures.

SUMMARY OF THE INVENTION

The stated object, and other objects besides, can be realized according to the invention with a satellite telecommunications system which features multi-beam coverage and dynamically controlled allocation of satellite transmission capacity, of the type wherein a number of earth stations are linked to a satellite on board which regeneration of the earth-to-satellite signal is brought about. The system features a modular beam-switching pattern and utilizes asynchronous type protocol procedures in allocation of the satellite transmission capacity between the various earth stations, both for bursts exchanged between earth traffic stations carrying telephone conversations and videoconferences, and master station wherein recognition and recovery of bursts transmitted by a given DSI station can be effected by the DSI receiving station with control retained by the same DSI transmitting station, which enables attachment of a preamble to such bursts, and for the remote control of an on-board switching matrix controlling the overall system; the system thus arranged is controlled by microprocessors of requisite capacity.

BRIEF DESCRIPTION OF THE DRAWINGS

A preferred embodiment of the satellite telecommunications system according to the invention, which is one featuring multi-beam coverage and dynamically controlled allocation of the satellite transmission capacity, will now be described by way of example with the aid of the accompanying block diagram which illustrates an essential feature of the system, the microprocessor and relative circuits that control the satellite's on-board beam-switching matrix.

DESCRIPTION OF THE PREFERRED EMBODIMENT

In the diagram, 1 denotes a microprocessor enabled for receipt and handling of a burst carrying remote control signals for an on-board switching matrix 2 for a satellite 2a. Handling of the remote control burst is accomplished by two memories interconnected by and operating in concert with the microprocessor 1—viz, a deferred instructions memory 3 for the storage of control data to be used at a future moment, and a program memory 4 governing operation of the microprocessor 1.

Also connected to the microprocessor 1, one has a provisional priority data table 5 holding information used for validity check purposes, prior to the transfer of such data into a definitive priority table once the instruction to implement has been given; 6 denotes the definitive priority data table.

7 denotes an operative memory with the time cycle to be implemented by the matrix; 8 is a standby memory by means of which to store modifications of the time cycle contained in the operative memory 7. 9 denotes a monitor system providing the exchange between operative and standby memories, needed for implementation of the on-board matrix remote control instructions; these memories are referred to in detail further on in the section regarding operation of the system.

In a satellite telecommunications system according to the invention, use is made of asynchronous type protocol procedures: that is, implementation of the procedure is not instantaneous. More exactly, the protocol procedure consists of a set of operations to be carried out in sequence, wherein one operation cannot be brought about unless the operation preceding it has been successfully accomplished. In short, variations in the beam switching pattern are brought in frames whose identification need not necessarily be rigid.

With this method of proceeding one obtains a dependability and security in implementation of the protocol required by the DSI stations, that cannot be guaranteed with a synchronous type procedure. It is clear that more time may be needed to make extensive rearrangements in traffic; nonetheless, such a drawback does not occasion any great delays in a system according to the invention, since operation in dynamic mode signifies that only adaptations are called for, as and when necessary, and not fundamental rearrangement of the time plan ; in this way one achieves optimized allocation of the entire satellite transmission capacity.

The inclusion of a master station 2b with asynchronous protocol procedures amongst the other earth stations is necessary from the operation standpoint. In DSI telephony, this station 2b is informed from outside of each new network requirement, in terms of channel allocations to the various earth stations, and processes new time plan instructions which are duly transmitted to the traffic stations 2c involved.

The system utilizes as many protocol procedures as there are types of traffic, i.e. four: two for DSI telephone traffic, one for non-DSI telephone traffic and a fourth for video broadcasts, each one with its own specific timing and steps (too detailed to be described adequately in this application). In the case of DSI traffic, the master station 2b supplies all the information regarding transmission, thereby functioning as an intelligent station in relation to the earth stations, whereas reception information is supplied directly from the corresponding traffic station 2c which labels the bursts one by one with a preamble characteristic of the DSI station transmitting, not of the master station 2b, in order to enable recognition and recovery, when receiving, of all the bursts emitted from the DSI station in question. This condition is necessary for correct operation of the system, most especially where strong atmospheric attenuation occurs.

Messages which the master station 2b exchanges with the traffic station 2c may be numbered, 0 to 127, or otherwise.

The adoption of a redundancy factor of $\frac{1}{2}$ permits obtaining reduced error levels after decoding, whilst any residual error is shown up by a parity check.

In order to avoid too fast an average message transfer rate, the transmission channel is supplied by the satellite 2a itself, though utilizing a signaling structure whereby selective rejection of messages is possible. There are two signaling channels, one of which is the DSI signaling channel containing the allocation message (earth channel-satellite channel) common to all digital speech interpolation systems; the other is the channel containing a message that permits delivering a burst to the receiving DSI station in the identical state to that emitted from the transmitting DSI station.

The DSI maps which associate DSI Tx and DSI Rx are supplied by the master station 2b and distributed to the system using the station-to-satellite signaling channel. Maps are distributed to stations either reentering the frame or entering it for the first time, or whenever modifications are made to the maps themselves.

In addition, there is a fifth protocol procedure, to be followed by the master station 2b when updating the monitor 9 which controls the switching matrix 2. This protocol procedure may be adopted both for immediate implementation of the remote control signal received from the master station 2b or from video-conferencing chairmen sources, and in cases where the signal must be re-transmitted to earth prior to its implementation.

Security of the protocol procedure is thus ensured by re-transmission to earth before implementation, in the case of deferred instructions stored in the memory denoted 3, whereas in the case of real time operations, security is ensured by the fact that the instruction refers to areas of the beam-pattern that are accessible only to the party emitting the instruction.

Instruction validity check data is stored initially in the provisional priority table 5 before being transferred to the definitive table 6.

Where a considerable number of incoming channels, say 60, happen to be in use at a DSI station, the likelihood that more than half the subscribers will be speaking at any given moment is small, given that in the average telephone conversation neither subscriber will speak for more than 35 to 40% of the total time connected. It becomes possible therefore, to use just half the satellite channels for transmission of signals originating from subscribers when actually speaking.

The coverage technique adopted in the satellite communications system according to the invention is of a multi-beam type, covering the entire area served by way of say, 6 beams, each of which is coupled to a repeater rated 147,456 Mbps.

The preferred method of access for this multi-beam type coverage is SS-TDMA, in which switching operations are performed by the satellite 2a itself so as to permit interconnecting all antenna beams within the specified coverage. In TDMA, multiple access is performed to the satellite on a time-division basis, whereby each station transmits its burst during an assigned state of a beam switching pattern repeated every $M \times 125$ μsec, where M is an integer. This system allows the significant advantage of having only one carrier at satellite level, which is utilized by all the earth stations in turn; thus one avoids problems connected with the effects of intermodulation, which are characteristic of other types of access.

A further, functional advantage of a system featuring multi-beam coverage and dynamic control of the allocation of satellite transmission capacity is that the satellite 2a becomes a genuine repeater, with regeneration of the signal brought about on board; the switching matrix operates at base band, not at intermediate frequency. Also, one has the facility of on-board generation of the TDMA beam-pattern pass word, thus eliminating the need for additional earth stations and relative stand-by protocol procedures.

There are other advantages offered by the system, such as the certainty of excluding multiple paths within the satellite, and the plus factors of better equalization and lower error rates.

Finally, with a modular switched beam pattern, all earth stations can transmit different bursts for different media or different allocation techniques, namely: DSI telephony, in bursts known as 'bricks' (4 channels at 32 Kbps plus preamble); non-DSI telephony utilizing 'mini-bricks' (1 channel at 32 Kpbs plus preamble) and video broadcast. There are also 'super-bricks' of 30 channels at 64 Kbps, obtained by putting 15 bricks together.

These sub-divisions permit creation of the modular beam pattern to which the invention relates, whereby parts of the switched pattern allocated to the different types of burst can be varied from transponder to transponder. By dividing the length of the two parts of the beam pattern (bricks and mini-bricks) and the type of traffic occupying it (say, DSI-telephony), the system is invested with complete flexibility, and one also has the bonus of a facility for transmission of, say, a digital television signal, obtained by maneuvering the confines between sections of the beam pattern relative to one transponder and leaving those of the remainder untouched.

TMDA terminals are provided with common logic equipment (CLE) which is the section responsible for transmission of bursts according to the established time plan; synchronisation is thus maintained, all the bursts being transmitted in their allocated position within the beam pattern.

The system, as described and integrated according to the foregoing specification, thus realises the stated objective by virtue of its providing optimum handling of the signals transmitted from earth stations to satellite.

What is claimed is:

1. A micro-processor controlled satellite telecommunications system featuring multi-beam coverage and dynamically controlled allocation of satellite transmission capacity, wherein a number of earth stations are linked by a modular beam switching pattern to a satellite which provides on board regeneration of the earth-to-satellite signal, said system comprising
   at least one satellite and a plurality of earth stations each comprising a sending and receiving station, one each of said sending and receiving stations being at least a digital speech interpolation station.
   asynchronous type protocol procedures adopted for allocation of the satellite transmission capacity between the various earth stations,
   a master station,
   signal bursts exchanged between earth traffic stations and with said master station according to said asynchronous protocols, wherein recognition and recovery of bursts transmitted by a given digital speech interpolation station can be achieved by the digital speech interpolation receiving station with control retained by the same transmitting station, according to a remote control signal in the form of a preamble attached to each said burst, and
   an on-board switching matrix remotely controlled according to said bursts and preambles, with reference to said asynchronous protocols, and which in turn controls the overall system 2. System as in claim 1 wherein remote control of the on-board switching matrix (2) is implemented by a number of memories controlled by a microprocessor (1), adopting an appropriate protocol procedure.

3. System as in claim 1 wherein conversation between the master station and traffic stations is handled by the distribution of appropriate maps through a signaling channel, for which purpose a further a synchronous protocol procedure is adopted.

4. A system according to claim 1 wherein said on board switching matrix comprises
   a control microprocessor adapted to receive and handle said bursts and preambles,
   a program memory governing the operation of said control microprocessor,
   a deferred instruction memory interconnected with said microprocessor, the program and deferred instruction memories operating in concert with said microprocessor,
   a provisional priority data table connected to said microprocessor,
   a definitive priority data table connected to said microprocessor and selectively receiving data from said provisional priority data table via said microprocessor,
   an operative memory connected to said microprocessor and storing the time cycle to be implemented by said matrix,
   a standby memory connected to said microprocessor and storing modification of the time cycle stored in the operative memory, and
   a monitor means connected to said microprocessor and said operating and standby memories, said monitor means being adapted to provide an exchange between the operating and standby memories and the microprocessor.

5. A system according to claim 1 wherein two asynchronous protocols are provided for digital speech interpolation traffic and the total number of asynchronous protocols corresponds to the number of different types of signal traffic.

6. A system according to claim 1 wherein transmission information is supplied by the master station and reception information is supplied by each transmitting station, and wherein each preamble attached to each burst is generated in a manner which identifies a corresponding transmitting station.

7. A system according to claim 1 wherein the satellite provides a tandem transmission channel having a signal structure adapted to selectively reject messages, said tandem channel carrying an allocation message along one channel and a routing message along another channel, the routing message permitting delivery of bursts to an appropriate receiving station in the identical state said bursts were emitted from the transmitting station.

8. A system according to claim 1 wherein said bursts are in the form of bricks selected from the group consisting of 4 channels at 32 Kbps and 1 channel at 32 Kbps, not including the preamble.

* * * * *